United States Patent
Marchini et al.

(10) Patent No.: US 10,213,977 B2
(45) Date of Patent: Feb. 26, 2019

(54) PROCESS AND APPARATUS FOR MANUFACTURING TYRES FOR VEHICLE WHEELS

(71) Applicant: Pirelli Tyre S.p.A., Milan (IT)

(72) Inventors: Maurizio Marchini, Milan (IT); Cesare Emanuele Amurri, Milan (IT); Marco Cantu, Milan (IT); Gianni Mancini, Milan (IT); Giorgia Sgalari, Bologna (IT)

(73) Assignee: PIRELLI TYRE S.p.A., Milan (IT)

( * ) Notice: Subject to any disclaimer, the term of this patent is extended or adjusted under 35 U.S.C. 154(b) by 240 days.

(21) Appl. No.: 15/099,069

(22) Filed: Apr. 14, 2016

(65) Prior Publication Data

US 2016/0229141 A1    Aug. 11, 2016

Related U.S. Application Data

(62) Division of application No. 13/960,414, filed on Aug. 6, 2013, now Pat. No. 9,339,980, which is a division (Continued)

(51) Int. Cl.
*B29D 30/30* (2006.01)
*B29D 30/00* (2006.01)
*B29D 30/16* (2006.01)

(52) U.S. Cl.
CPC .......... *B29D 30/30* (2013.01); *B29D 30/005* (2013.01); *B29D 30/1657* (2013.01); *B29D 30/3057* (2013.01)

(58) Field of Classification Search
CPC .............. B29D 30/1642; B29D 30/165; B29D 30/1657; B29D 30/30; B29D 30/3042;

(Continued)

(56) References Cited

U.S. PATENT DOCUMENTS

| 1,453,865 A | 5/1923 | Dickinson et al. |
| 5,281,289 A | 1/1994 | Debroche et al. |

(Continued)

FOREIGN PATENT DOCUMENTS

| EP | 0 928 680 | 7/1999 |
| EP | 1 568 475 | 8/2005 |

(Continued)

OTHER PUBLICATIONS

International Search Report from European Patent Office dated Aug. 19, 2008 in corresponding International Application No. PCT/IB2007/054675.

*Primary Examiner* — Geoffrey L Knable
(74) *Attorney, Agent, or Firm* — Finnegan, Henderson, Farabow, Garrett & Dunner, L.L.P.

(57) ABSTRACT

A carcass ply is built on a forming drum by application of a plurality of strip-like elements by the steps of: setting a width of these strip-like elements, setting a width of the overlapped part between two adjacent strip-like elements, setting a fitting diameter of the forming drum by calculating a corresponding extension of a radially external laying surface, and calculating a whole number of strip-like elements to be applied. The whole number of drip-like elements is applied by rotating the forming drum around a geometric rotation axis thereof, and applying pairs of strip-like elements by means of a first laying unit and a second laying unit located close to opposite portions of the forming drum relative to the geometric rotation axis. When the calculated whole number of strip-like elements is an odd number, before at least one application step, the first laying unit is shifted along an adjustment path orthogonal to the geometric rotation axis and substantially tangent to the radially external laying surface of the forming drum.

11 Claims, 6 Drawing Sheets

Related U.S. Application Data of application No. 12/744,880, filed as application No. PCT/IB2007/054875 on Nov. 30, 2007, now Pat. No. 8,535,465.

(58) Field of Classification Search
CPC .............. B29D 30/305; B29D 30/3057; B29D 2030/082
See application file for complete search history.

(56) References Cited

U.S. PATENT DOCUMENTS

| | | |
|---|---|---|
| 5,328,532 A | 7/1994 | Azuma et al. |
| 6,355,126 B1 | 3/2002 | Ogawa et al. |
| 2001/0023736 A1* | 9/2001 | Mayet .................... B29D 30/10 |
| | | 156/117 |
| 2003/0051794 A1 | 3/2003 | Suda et al. |
| 2005/0077011 A1 | 4/2005 | Pialot |
| 2006/0162848 A1* | 7/2006 | Weissert ............ B29D 30/1635 |
| | | 156/117 |
| 2006/0169392 A1 | 8/2006 | Akiyama et al. |
| 2007/0012405 A1 | 1/2007 | Cordaillat et al. |
| 2007/0125482 A1* | 6/2007 | Weissert ............ B29D 30/1635 |
| | | 156/117 |
| 2009/0236029 A1 | 9/2009 | Sangiovanni et al. |

FOREIGN PATENT DOCUMENTS

| | | |
|---|---|---|
| WO | WO 01/38077 | 5/2001 |
| WO | WO 2006/129326 | 12/2006 |

* cited by examiner

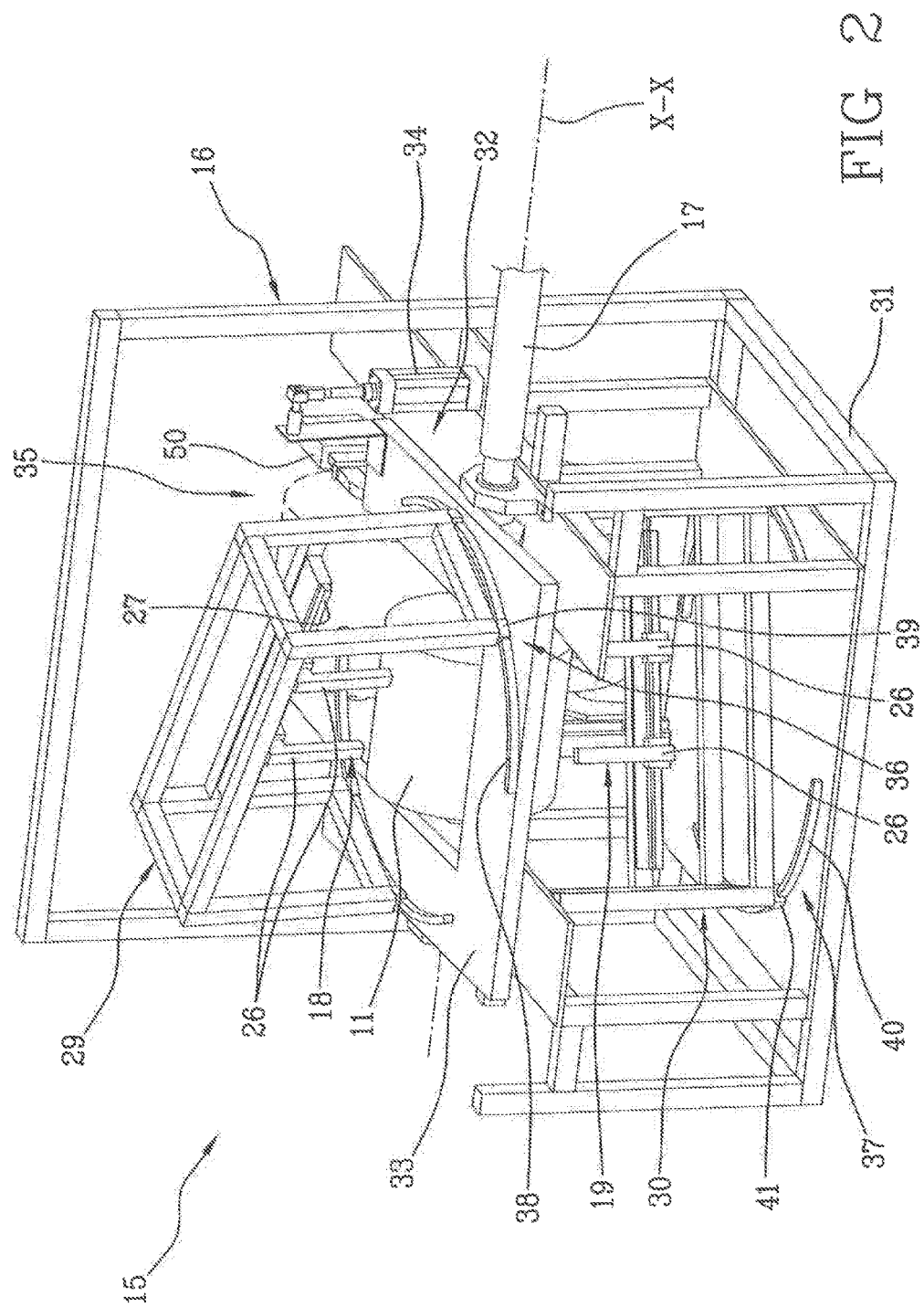

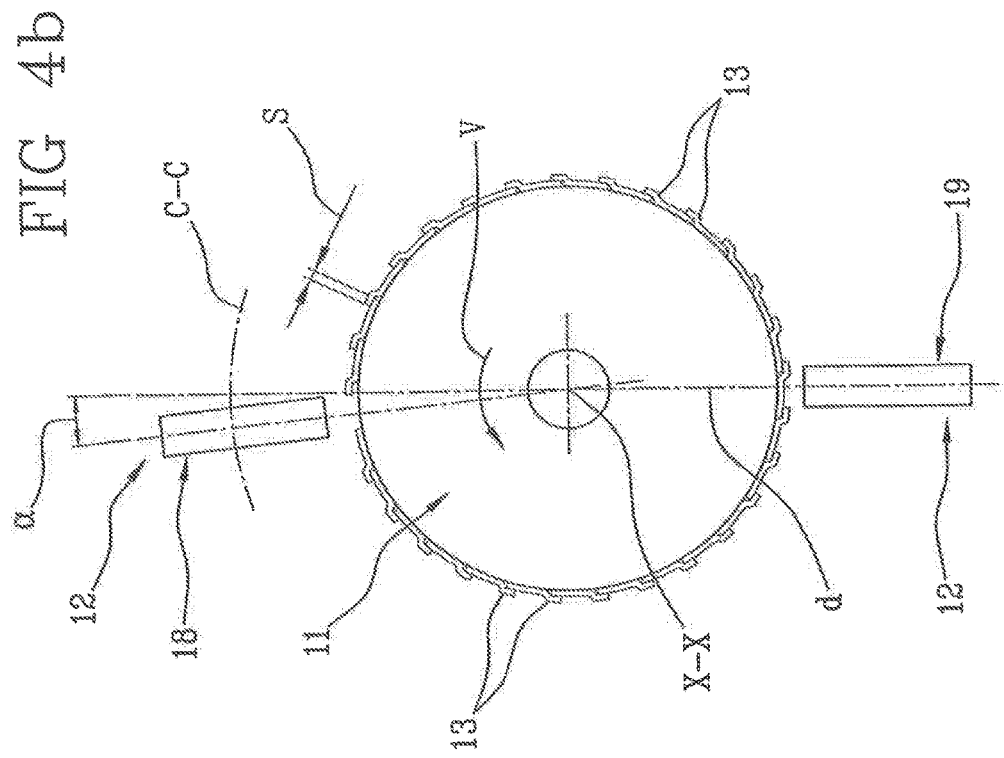
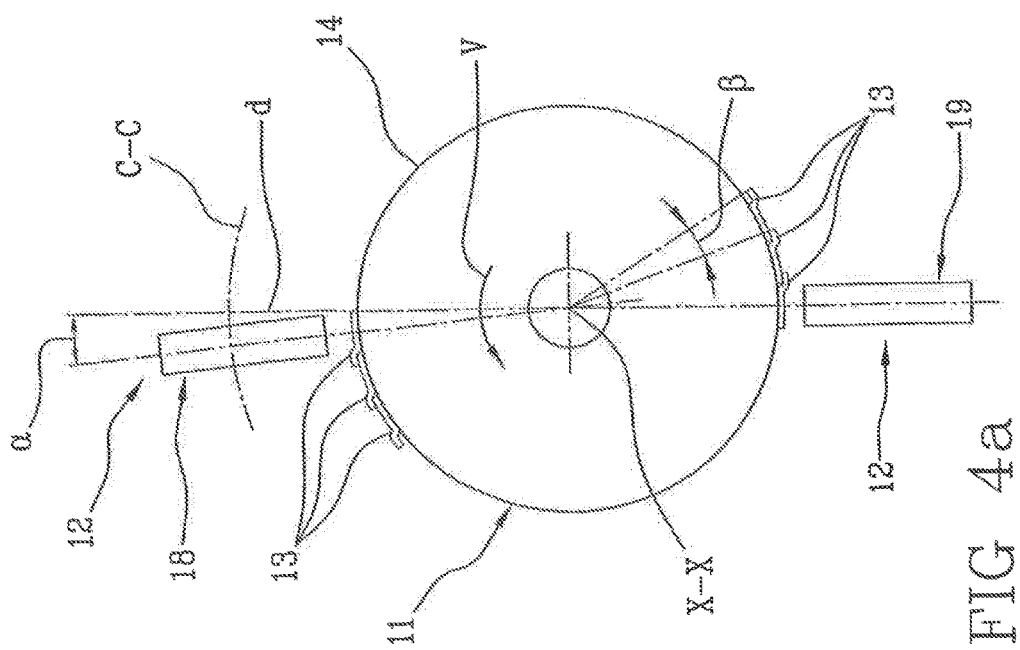

PROCESS AND APPARATUS FOR MANUFACTURING TYRES FOR VEHICLE WHEELS

CROSS REFERENCE TO RELATED APPLICATIONS

This application is a division of application Ser. No. 13/960,414, filed Aug. 6, 2013, which is a division of application Ser. No. 12/744,880, filed May 26, 2010, which is a national phase application based on PCT/IB2007/054875, filed Nov. 30, 2007, the content of which is incorporated herein by reference.

BACKGROUND OF THE INVENTION

Field of the Invention

The present invention relates to a process and an apparatus for manufacturing tyres for vehicle wheels.

The present invention further relates to a method of building at least one carcass ply during manufacture of a tyre for vehicle wheels.

In more detail, the invention is particularly directed to the process and equipment that, during building of a green tyre, are used for the purpose of manufacturing carcass plies.

Description of the Related Art

A tyre for vehicle wheels generally comprises a carcass structure including at least one carcass ply having respectively opposite end flaps in engagement with respective annular anchoring structures integrated into the regions usually identified with the name of "beads", and having an inner diameter substantially corresponding to a so-called "fitting diameter" of the tyre on a respective mounting rim.

Associated with the carcass structure is a belt structure comprising one or more belt layers, disposed in radially superposed relationship with respect to each other and to the carcass ply and having textile or metallic reinforcing cords with a crossed orientation and/or substantially parallel to the circumferential extension direction of the tyre. A tread band is applied at a radially external position to the belt structure, the tread band too being made of elastomeric material like other semifinished products constituting the tyre.

Respective sidewalls of elastomeric material are also applied at an axially external position to the side surfaces of the carcass structure, each extending from one of the side edges of the tread band until close to the respective annular anchoring structure to the beads. In tyres of the tubeless type an airtight coating layer, usually identified as "liner," covers the inner surfaces of the tyre.

Subsequently to building of the green tyre obtained through assembly of respective components, a vulcanisation and moulding treatment is generally carried out, said treatment aiming at causing structural, stabilisation of the tyre by cross-linking of the elastomeric compounds, as well as at impressing it with a desired tread pattern and with possible distinctive graphic signs at the tyre sidewalls.

The carcass structure and belt structure are generally made separately from each other in respective work stations to be mutually assembled at a second time.

In more detail, manufacture of the carcass structure first involves application of the carcass ply or plies onto a building drum. Subsequently the annular anchoring structures to the beads are fitted or formed on the opposite end flaps of the carcass ply or plies and are afterwards turned up around the annular structures themselves so as to encompass them in a sort of loop to form a so-called substantially cylindrical "carcass sleeve". In the most widespread production processes, the carcass plies are made starting from an article of manufacture in the form of a continuous strip, formed of cords of textile, or in some cases metallic, material, disposed parallel to each other in a matrix of elastomeric material. Then a segment of a length corresponding to the circumferential extension of the carcass ply to be obtained is cut from said continuous strip. The segment is wound up on the outer surface of a building drum and the opposite ends thereof are joined together to form a carcass ply.

At the same time, a so-called "outer sleeve" is made on a second drum or auxiliary drum, which sleeve comprises the belt layers applied in radially superposed relationship with respect to each other, and possibly the tread band applied at a radially external position to the belt layers. The outer sleeve is then picked up from the auxiliary drum to be coupled with the carcass sleeve. To this aim, the outer sleeve is coaxially disposed around the carcass sleeve and then the carcass ply or plies are shaped into a toroidal configuration by axially approaching the beads to each other and simultaneously admitting fluid under pressure into the carcass sleeve, so as to give rise to radial expansion of the carcass plies until causing adhesion of same against the inner surface of the outer sleeve.

Assembly of the carcass sleeve to the outer sleeve can be carried out on the same drum as used for manufacturing the carcass sleeve, in which case the process is referred to as a "unistage building process".

Also known are building processes of the so-called "two-stage type" in which a so-called "first-stage drum" is used to make the carcass sleeve, while assembly between carcass structure and outer sleeve is carried out on a so-called "second-stage drum" or "shaping drum" onto which the carcass sleeve picked up from the first-stage drum and subsequently the outer sleeve picked up from the auxiliary drum are transferred.

To the aims of the present specification and the following claims, by "strip-like element" it is intended an elongated article of manufacture having a cross-section profile with a flattened conformation and comprising one or more cords of textile and/or metallic material, extending parallel to the longitudinal extension of the strip-like element itself and embedded into, or at least partly coated with, at least one layer of elastomeric material.

Document E0928680 in the name of the same Applicant, shows that the carcass plies are made of strip-like elements formed with rubberised cords, laid down in circumferential mutually approached relationship on the outer surface of a toroidal forming support substantially conforming in shape to the inner conformation of the tyre being manufactured. One or more belt layers are subsequently formed by means of respective strip-like elements laid down in circumferential mutually approached relationship on the carcass ply or plies carried by the toroidal forming support.

Document WO01/38077 in the name of the same Applicant, shows that a belt structure is made of thread segments each comprising parallel cords embedded into an elastomeric layer and sequentially laid in circumferential mutually approached relationship on a toroidal support. During laying of each segment, an angular rotation of the toroidal support is determined around a correction axis radial to the rotation axis of the toroidal support itself, located at a substantially barycentric position relative to the segment that is about to be laid.

SUMMARY OF THE INVENTION

The Applicant has noticed that the same type of strip-like elements shown in EP0928680 or WO01/38077 can be used for manufacturing tyres in the previously-described apparatuses of the unistage or two-stage types, in which the carcass sleeve is submitted to radial expansion until making it adhere against the inner surface of the outer sleeve.

The Applicant has felt the necessity to make carcass structures for tyres through laying of strip-like elements using laying cycles quick enough to enable this step to be carried out in high-productivity apparatuses for tyre manufacture.

The Applicant has therefore noticed that by laying the strip-like elements on a forming drum (of a substantially cylindrical shape) in an even number and two by two, by means of the laying units located at substantially opposite portions of the drum relative to the rotation axis of the drum itself, the time of a work cycle necessary to make each ply and therefore each carcass structure can be reduced.

The Applicant has further felt the necessity to make carcass structures for tyres on the same apparatus, by laying strip-like elements for producing tyres with different sizes.

In this regard, the Applicant has observed that the outer circumferential extension of the building drum used for building each carcass ply must correspond to a multiple integer of the pitch between two strip-like elements in succession.

This pitch, if the strip-like elements are disposed close to each other, corresponds to an arc of a circumference subtended by each strip-like element on the surface of the drum itself.

If the strip-like elements partly overlap each other, the pitch corresponds to the arc of a circumference subtended by each strip-like element to which the width of the overlapped part must be subtracted, i.e. the mutual-overlapping length between two adjacent strip-like elements measured along the circumferential extension of the drum.

The Applicant has observed that this condition is at least affected by the width size of the strip-like elements being employed and by the laying angle of same on the forming drum surface, as well as by the width of the overlapped part that must have values within predetermined ranges, and by the circumferential extension of the drum itself which is linked to the fitting diameter of the tyre.

The Applicant has also observed that with use of strip-like elements having a few millimeter width, a width included between 3 mm and 5 mm for example, and controlling the amount of the overlapped part between a strip-like element and the subsequent one, the above described solution in order to ensure building of tyres different from each other at each cycle, by use of two laying units, could always be employed because management of an in any case even number of strip-like elements to be laid on the forming drum, by varying the width of the overlapped part, is of easy accomplishment.

However the Applicant has noticed that use of strip-like elements having a moderate cross width inevitably gives rise to longer building times even with use of the above described laying units.

The Applicant has seen that this problem can be solved with use of strip-like elements having a width in the order of one or more tens of a millimeter. In this case however, for some tyre sizes, it could not be possible to control, by means of said overlapped parts, the space taken up by a single "odd" strip-like element resulting from division of the circumference of the forming support by the width of the strip-like elements themselves. Since empty spaces cannot be left, in particular due to the subsequent shaping step briefly described above, that in this case would produce unacceptable unevennesses, one strip-like element is to be compulsorily added in order to come back to an even number, but in this case the overlapped parts between the strip-like elements become excessive and have repercussions on the quality of the finished product.

The Applicant has further, noticed that solving the above mentioned problems by use of a specific drum for each size and type of tyre to be made, which drum has to be then combined with specific equipment adapted to manufacture the strip-like elements of suitable width, would be uneconomic.

The Applicant has therefore felt the necessity to make carcass structures for tyres through laying of strip-like elements without being obliged to be submitted to the above described constraints.

The Applicant has realised that by planning the laying units in such a manner that at least one of them has at least one degree of freedom relative to the laying surface of the strip-like elements makes it possible, in case of need, to lay single strip-like elements too (therefore with a total odd number of them) in order to solve the above mentioned problems relating to the production speed and flexibility in an efficient and cheap manner.

More specifically, the Applicant has found that by adjusting the position of at least one of the two laying units along an arced path of travel about the radially external laying surface, a whole number of strip-like elements can be laid down, so that the design specifications can be always observed.

In accordance with a first aspect, the invention relates to a method of building at least one carcass ply during manufacture of a" tyre, said carcass ply being built by laying an odd whole number of strip-like elements on a radially external surface exhibited by a forming drum, said method comprising the steps of:
rotating the forming drum around a geometric rotation axis thereof;
applying said strip-like elements through a first laying unit and a second laying unit located close to opposite portions of said forming drum relative to the geometric rotation axis;
wherein, before at least one application step, the first laying unit is submitted to shifting along an adjustment path that lies in a plane orthogonal to the geometric rotation axis and is substantially arced about the radially external laying surface of the forming drum.

In more detail, in accordance with a second aspect, the invention relates to a process for manufacturing tyres for vehicle wheels, each tyre comprising a carcass structure, a tread band at a radially external position to said carcass structure and a belt structure interposed between said carcass structure and tread band, wherein the step of building the carcass structure comprises at least the steps of:
building at least one carcass ply on a forming drum around at least one radially external laying surface by application of a plurality of strip-like elements, said at least one carcass ply having axially opposite end flaps;
coaxially engaging an annular anchoring structure around each of the end flaps; wherein the step of building said at least one carcass ply comprises at least the steps of:
setting a fitting diameter of the forming drum;
setting a radial thickness of components of the tyre present on the forming drum before the step of building said at least one carcass ply;
calculating a corresponding extension of the radially external laying surface;
setting a width W of said strip-like elements;

setting a width of the overlapped part S between two adjacent strip-like elements;—setting a ply angle γ;

calculating a whole number of strip-like elements to be applied;

applying the calculated whole number of strip-like elements by rotating the forming drum around a geometric rotation axis thereof, and applying said strip-like elements through a first laying unit and a second laying unit located close to opposite portions of said forming drum relative to the geometric rotation axis;

wherein, when the calculated whole number of strip-like elements is an odd number, before at least one application step, the first laying unit is submitted to shifting along an adjustment path that lies in a plane orthogonal to the geometric rotation axis and is substantially arced about the radially external laying surface of the forming drum.

Thus, more production flexibility is advantageously given to the plants for building tyres. In fact, it is the Applicant's opinion that, given the circumferential extension of the radially external surface exhibited by the drum resulting from the fitting diameter of the tyre and from the tire components already present on the drum itself, given the width of the strip-like elements, given the ply angle and given a design width of the overlapped part, adjustment of the position of one of the laying units enables an even or odd whole number of strip-like elements to be laid down, of such a value that the true width of the overlapped part always keeps within a predetermined and acceptable range.

In addition, by the invention it is possible to use sufficiently wide strip-like elements so that their number along the circumferential extension of the drum can be contained within limits, as well as the time of the work cycle.

In accordance with a further aspect, the invention relates to an apparatus for manufacturing tyres for vehicle wheels, each tyre comprising a carcass structure, a tread band at a radially external position to said carcass structure, and a belt structure interposed between said carcass structure and tread band, said apparatus comprising:
 a forming drum having at least one radially external laying surface;
 devices for building at least one carcass ply around said radially external surface, said at least one carcass ply having axially opposite end flaps;
 devices for coaxially engaging an annular anchoring structure around each of the end flaps; wherein the devices for building at least one carcass ply around said radially external surface comprise:
 devices for setting the forming drum in rotation around a geometric rotation axis thereof;
 a first laying unit and a second laying unit mounted to mutually opposite portions of the forming drum and adapted to apply a plurality of strip-like elements along the circumferential extension of the forming drum;
 an adjustment device for shifting the first laying unit along an adjustment path that lies in a plane orthogonal to the geometric rotation axis and is substantially arced about said radially external laying surface for applying a single strip-like element.

The present invention, in at least one of said aspects, can have one or more of the preferred features hereinafter described.

Preferably, the angular measure of said shifting corresponds to the angular measure in a transverse direction either of said strip-like element laid down on said forming drum or of a fraction thereof.

Said shifting is of such a nature as to create, during the laying steps and preferably at the end of same, a laying space corresponding to the space taken up by a single strip-like element laid down.

Preferably, the step of applying said strip-like elements by means of said first laying unit and said second laying unit takes place by application of said strip-like elements in pairs.

Preferably, said step of calculating said whole number of strip-like elements is carried out by dividing the extension of the radially external laying surface by the amount (W−S)/sin γ, and approximating the result to the closest whole number.

Preferably, said path is an arc of a circumference coaxial with the geometric rotation axis.

Still more preferably, shifting of the first laying unit—along said arc of a circumference subtends a predetermined angle measured with respect to a diametrical direction passing through the second laying unit.

Shifting along a circumference coaxial with the forming drum enables the laying unit to be always maintained to such a distance from the drum surface that a correct laying of the strip-like elements is allowed.

Preferably, rotation of the forming drum around the geometric rotation axis thereof is carried out by steps, each step corresponding to an advancing angle of said forming drum, so that the predetermined angle is about half said advancing angle.

Preferably, the predetermined angle is smaller than or equal to about 10°.

In addition, the predetermined angle is greater than or equal to about 2°.

More preferably, the predetermined angle is smaller than or equal to about 8°.

In addition, the predetermined angle is greater than or equal to about 4°.

The predetermined angle of minimum shifting of the laying unit is adapted to enable the last strip-like element to be laid down in the space of the side surface of the drum that has been left empty.

In accordance with a preferred embodiment of the invention, application of the strip-like element is carried out by:—applying a plurality of strip-like elements in pairs in succession, the two strip-like elements of each pair being simultaneously applied to the opposite portions of the radially external laying surface, the two strip-like elements of each pair being mutually offset relative to a diametrical direction passing through the geometric rotation axis of the forming drum;—applying a single strip-like element on a portion of the radially external laying surface that has been left empty.

In addition, at each of the first rotation steps a pair of strip-like elements of said plurality is applied and at a last rotation step the single strip-like element is applied.

In this way, it is possible to reduce the time of the work cycle to a minimum because all strip-like elements except the last one are laid in pairs, so that the required time is halved as compared with the case in which a single laying unit is used.

Preferably, the single strip-like element is laid down by the first laying unit.

Alternatively, the single strip-like element is laid down by the second laying unit.

In order that the unit laying the last strip-like element is that which was shifted, the first laying unit is moved along the path in a direction consistent with a rotation direction of the forming drum.

Alternatively, the first laying unit is moved along the path in an opposite direction relative to a rotation direction of the forming drum.

In accordance with a preferred embodiment of the invention, during application of each strip-like element, a relative angular rotation is carried out between the strip-like element and the forming drum around a correction axis that is substantially radial to the geometric rotation axis.

In addition, angular rotation around the correction axis is carried out in a progressive manner during application of the strip-like element.

It is therefore possible to lay down angled strip-like elements thereby ensuring a perfect structural homogeneity of the carcass ply.

According to an embodiment, the strip-like elements are applied in mutually approached relationship.

Preferably, the strip-like elements are applied in partly overlapped relationship with each other, so as to ensure continuity of the carcass structure also after radial expansion, as required to make said carcass structure adhere against the inner surface of the outer sleeve.

In accordance with a preferred embodiment of the invention, the process comprises the step of moving the forming drum forward along a transport line between subsequent work stations; wherein in order to apply said at least one carcass ply around said at least one radially external surface, said forming drum is picked up from the transport line and located between the first and second laying units; and wherein after application of said at least one carcass ply, said forming drum is put back on the transport line.

According to an embodiment, said radially external surface is the radially external surface exhibited by tyre components already laid down on said forming drum. This is, for instance, the case in which the carcass ply is build on a previously applied liner. Preferably said width of the overlapped part S is greater than or equal to about 1 mm.

Preferably said width of the overlapped part S is smaller than or equal to about 2.5 mm.

Preferably said ply angle γ is greater than or equal to about 60°.

Preferably said ply angle γ is smaller than or equal to about 90°.

Preferably, after the step of calculating the whole number of strip-like elements to be applied, a true width $S_e$ of the overlapped part is calculated.

Playing on the width variation of the overlapped part it is possible to correctly lay down the strip-like elements with a constant pitch.

Preferably, the width W of the strip-like elements is greater than or equal to about 20 mm.

In addition, preferably, the width W of the strip-like elements is smaller than or equal to about 40 mm.

More preferably, the width W of the strip-like elements is greater than or equal to about 25 mm.

More preferably, the width W of the strip-like elements is smaller than or equal to about 35 mm.

As already mentioned, use of strip-like elements of such a width allows the time for a work cycle to be contained within limits.

Preferably, said first laying unit and second laying unit are adapted to apply pairs of strip-like elements.

Preferably, said path is an arc of a circumference concentric with the geometric rotation axis.

In accordance with a preferred embodiment, the apparatus comprises a first auxiliary adjustment device and a second auxiliary adjustment device to shift each of said first and second laying units around respective correction axes that are substantially radial to the geometric rotation axis.

These features allow laying of strip-like elements on the forming drum with any angle relative to the circumferential extension of same.

Preferably, the apparatus comprises a bearing structure adapted to carry the forming drum; a first frame installed on the bearing structure above the forming drum and carrying the first laying unit; a second frame installed on the bearing structure under the forming drum and carrying the second laying unit; wherein the adjustment device is mounted between the bearing structure and the first frame, to shift the first laying unit along said adjustment path.

Preferably, the adjustment device comprises a supporting plate hinged on the bearing structure around a hinge axis coincident with the geometric rotation axis, and at least one actuator disposed between the supporting plate and the bearing structure; the first frame being installed on said supporting plate. The structure is compact and stiff and the apparatus is therefore able to lay down the strip-like elements in a quick and precise manner.

In addition, preferably, the supporting plate has a C-shaped conformation delimiting a housing region adapted to receive the forming drum.

The C-shaped conformation of the plate allows easy placement and removal of the forming drum.

Preferably, the second auxiliary adjustment device comprises:—arched guides mounted on the bearing structure and coaxial with a correction axis that is substantially radial to the geometric rotation axis; the second frame being mounted on said arched guides;
  at least one actuator to move the second frame on said arched guides.

In addition, the first auxiliary adjustment device comprises:
  arched guides mounted on the supporting plate and coaxial with a correction axis that is substantially radial to the geometric rotation axis; the first frame being mounted on said arched guides;
  at least one actuator to move the first frame on said arched guides.

The arched guides ensure an accurate movement of the frame, this movement accuracy also having repercussions on the laying accuracy of the strip-like elements.

According to an embodiment, the apparatus comprises successive work stations; a transport line extending between said successive work stations; a picking-up device to shift the forming drum between the transport line and a work region of the bearing structure positioned between the first and second laying units. Preferably, the picking-up device comprises a vertically movable lifter and a horizontally movable conveyor.

This structure allows mass working operations to be carried out in series, which gives rise to an increase in the productivity and a reduction in the production costs of the tyres.

Preferably, the forming drum has a substantially cylindrical side surface.

In addition, the apparatus comprises at least one calculation unit to calculate the whole number of strip-like elements to be laid down.

Preferably, said calculation unit is interfaced with a control unit for command of said adjustment device when an odd number of strip-like elements is to be laid down.

It is sufficient to enter the preset design values (input data) into the calculation unit to enable the apparatus to build the carcass ply in the correct manner. The work cycle therefore can be set and inputted easily and quickly.

BRIEF DESCRIPTION OF THE DRAWINGS

Further features and advantages will become more apparent from the detailed description of a preferred but not exclusive embodiment of a process and an apparatus for manufacturing tyres, in accordance with the present invention. This description will be set out hereinafter with reference to the accompanying drawings, given by way of non-limiting example, in which:

FIG. 2 is a perspective view of a station of the apparatus seen in FIG. 1, in which a carcass ply is laid down on a forming drum;

FIGS. 4a and 4b show diagrammatic side views of the forming drum housed in the station in FIG. 2 during respective steps of the process according to the-invention;

DETAILED DESCRIPTION OF THE INVENTION

Figure 1:
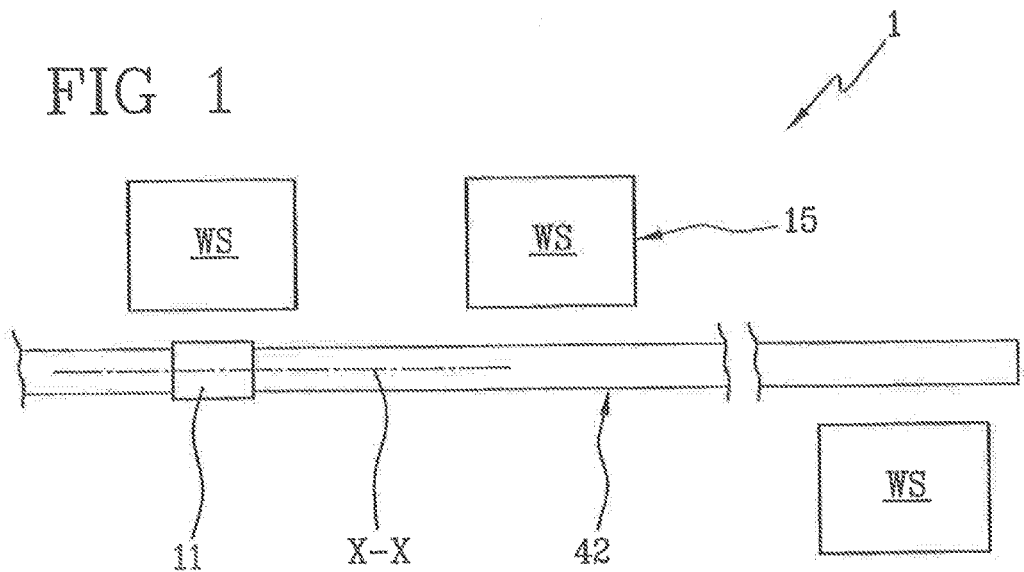
FIG. 1 diagrammatically shows a top view of an apparatus for manufacturing tyres for vehicle wheels made in accordance with the present invention.

With reference to the drawings, an apparatus for manufacturing tyres for vehicle wheels designed to put into practice a process according to the present invention has been generally identified with reference numeral 1.

Figure 7:
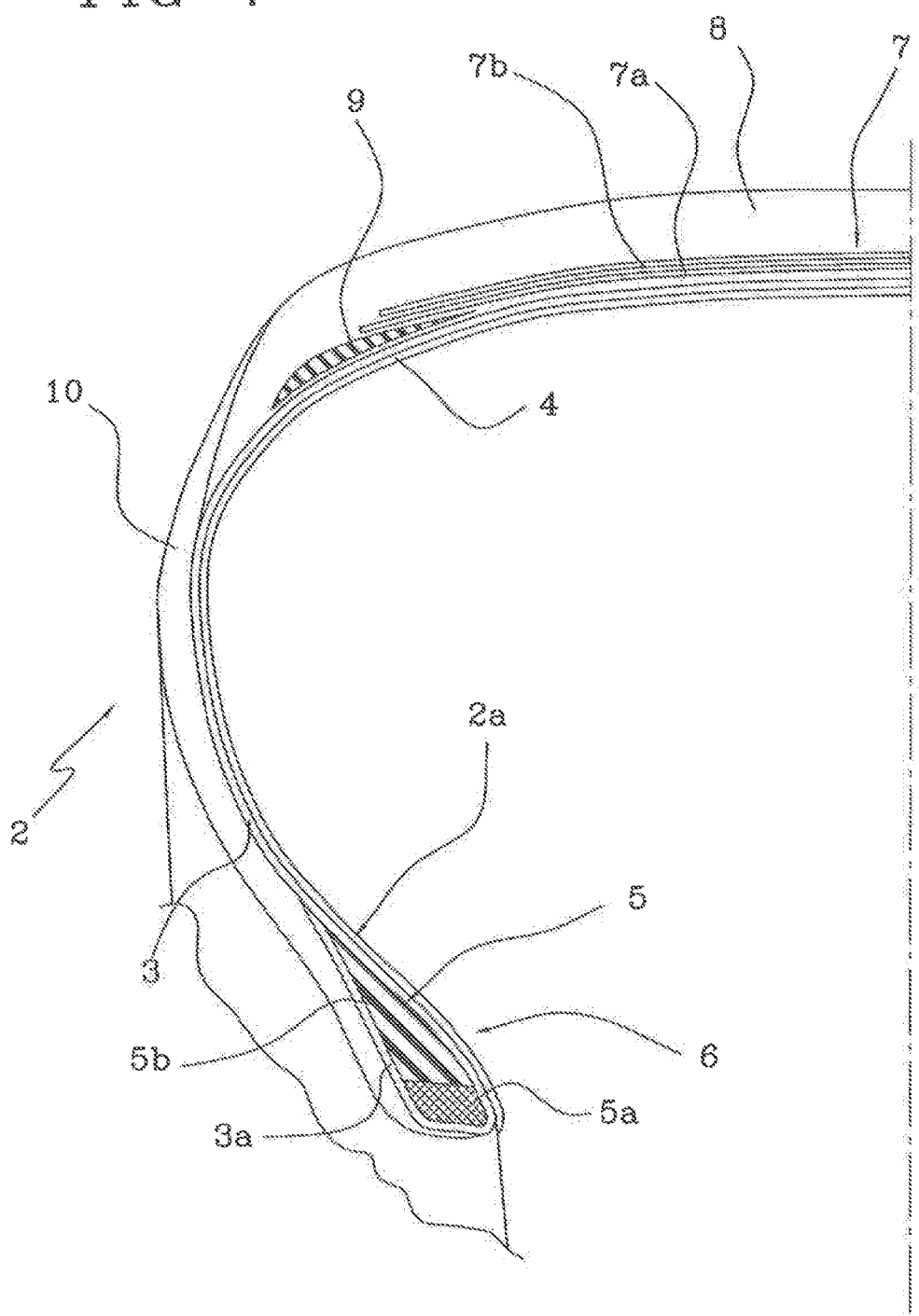
FIG. 7 is a fragmentary diametrical section view of a tyre that can be manufactured with the process and apparatus in question.

Apparatus 1 is designed to manufacture tyres 2 (FIG. 7) essentially comprising a carcass structure 2a having at least one carcass ply 3. A layer of airtight elastomeric material, or so-called "liner" 4, can be applied internally of the carcass ply/plies 3. Two annular anchoring structures 5 each comprising a so-called bead core 5a carrying an elastomeric filler 5b at a radially external position, are in engagement with respective end flaps 3a of the carcass ply/plies 3. The annular anchoring structures 5 are integrated close to regions usually identified with the name of "beads" 6, at which usually engagement between tyre 2 and a respective mounting rim occurs.

A belt structure 7 comprising one or more belt layers 7a, 7b is circumferentially applied around the carcass ply/plies 3 and a tread band 8 is circumferentially superposed on the belt structure 7.

So-called "underbelt inserts" can be associated with the belt structure 7; they are each located between the carcass ply/plies 3 and one of the axially opposite end edges of the belt structure 7. In addition, or as an alternative to the underbelt inserts 9, annular inserts (not shown) of elastomeric material and/or comprising textile or metallic cords substantially parallel to the circumferential extension direction of the tyre (0-degree belt layer) or other reinforcing elements can be radially superposed at least on the axially opposite end edge of the belt layers 7a, 7b and/or interposed between the belt layers 7a, 7b themselves at least at said end edges.

Two sidewalls 10 each extending from the corresponding bead 6 to a corresponding side edge of the tread band 8, are applied at laterally opposite positions to the carcass ply/plies 3.

Apparatus 1 comprises a forming drum 11 on which at least part of the components designed to form the carcass structure 2a of tyre 2 is built and/or assembled. The forming drum 11 can consist either of a first stage building drum if apparatus 1 is designed to carry out a building process of the so-called "two-stage" type, or of a building drum of the type usually referred to as "unistage" if a unistage building process is wished to be carried out.

In more detail, the forming drum 11 lends itself to first receive the possible liner 4 and subsequently the carcass ply or plies 3, so as to form a cylindrical carcass sleeve.

Devices not shown coaxially engage one of the annular anchoring structures 5 around each of the end flaps 3a by positioning an outer sleeve comprising the belt structure 7 and tread band 8 to a coaxially centred position around the cylindrical carcass sleeve and shaping the carcass sleeve into a toroidal configuration through radial expansion of the carcass ply, so as to cause application thereof against a radially internal surface of the outer sleeve.

Tyre 2 thus built lends itself to be submitted to a vulcanisation treatment and/or other working operations provided in the work cycle.

According to the present invention, it is provided that during building of tyre 2, said at least one carcass ply 3 be made by means of building devices 12 designed to apply a plurality of strip-like elements 13 in mutual circumferential contact relationship onto the forming drum 11, so as to form at least one ply layer having a continuous circumferential extension around the geometric axis "X-X" of said forming drum 11. The forming drum 11 has a radially external laying surface 14 that is substantially cylindrical.

Figure 3:
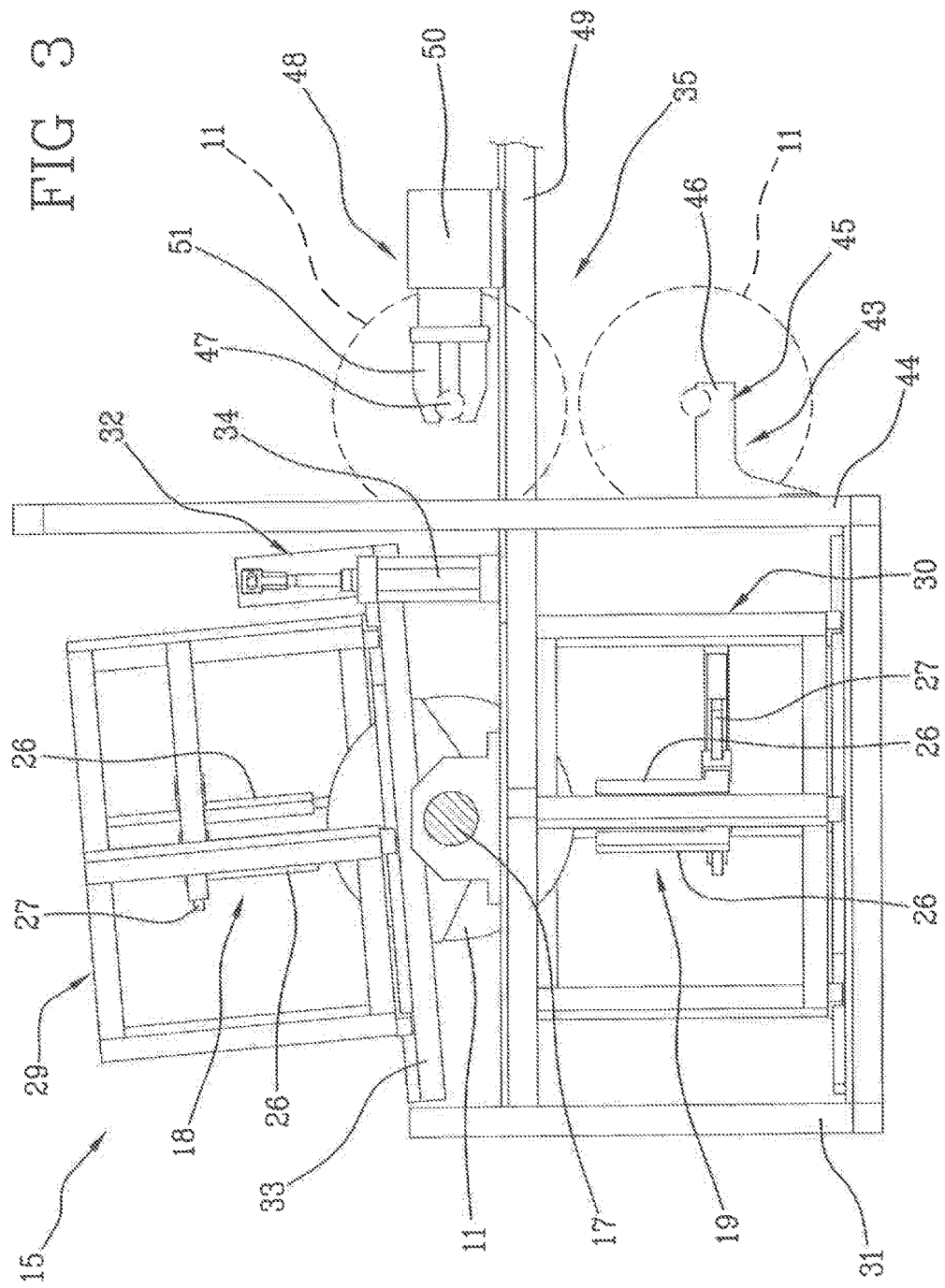
FIG. 3 is a side view of the station shown in FIG. 2.

The building devices 12 are placed in a laying station 15, shown in FIGS. 1, 2 and 3, which in the preferred embodiment comprises a bearing structure 16 consisting of a lattice of tubes.

The bearing structure 16 delimits a seat in which the forming drum 11 is positioned and supported in a rotatable manner around its geometric axis "X-X". Devices 17, in the form of a mandrel driven by a motor for example, serve to set the forming drum 11 in rotation around said geometric axis "X-X".

A first laying unit 18 and a second laying unit 19 are mounted on the bearing structure 16 close to mutually opposite portions of the forming drum 11 and are adapted to apply the strip-like elements 13 onto said forming drum 11 during rotation of the latter.

Preferably, the forming drum 11 is rotated by steps and after each rotation step, the laying units 18, 19 each simultaneously apply a strip-like element 13.

Figure 6:
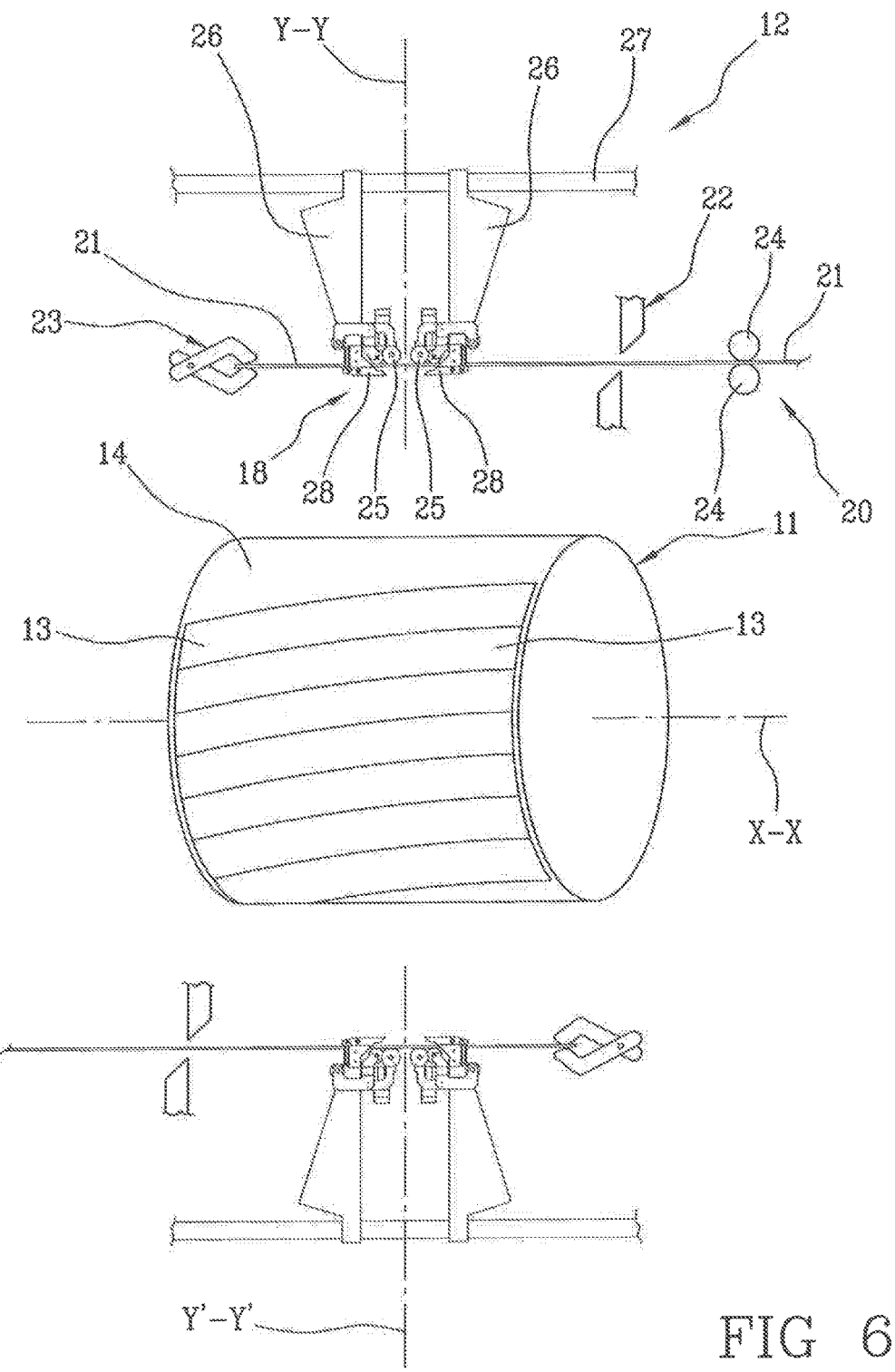
FIG. 6 diagrammatically shows a laying unit for strip-like elements.

Apparatus 1 further comprises two feeding units 20, each designed to supply the strip-like elements 13 of predetermined length, preferably one by one, to the respective laying unit 18, 19. For the sake of simplicity, FIG. 6 only shows the feeding unit 20 interlocked with the first laying unit 18.

The strip-like elements 13 are obtained by cutting operations sequentially carried out on at least one continuous strip element 21 coming from an extrusion and/or calendering device, or from a feed reel and therefore all have the same width "W". Preferably, this width "W" is included between about 20 mm and about 40 mm.

The continuous strip element 21, and consequently the strip-like elements 13 obtained therefrom, each have a plurality of cords or similar thread elements of metallic or textile material, extending parallel to each other along the longitudinal extension of the continuous strip element and the strip-like element itself, and at least partly coated with a layer of elastomeric material applied by an extrusion and/or calendering operation.

The laying units 18, 19 and feeding units 20 are of the type for example described in the International Patent Application WO2006IB002070 in the name of the same Applicant.

In particular, each feeding unit 20 comprises at least one cutting member 22 designed to cut the continuous strip element 21 perpendicularly or according to a predetermined inclination relative to the longitudinal extension of same, to obtain the individual strip-like elements 13.

Combined with the cutting member 22 is at least one grip member 23 movable between a first work position at which it is adapted to engage a final end of the continuous strip element 21 close to the cutting member 22, and a second work position at which it is spaced apart from the cutting member 22 itself.

Following translation from the first to the second work positions, the grip member 23 drags along the continuous strip element 21 so as to stretch it out beyond the cutting member 22 and preferably at a position radially close to the forming drum 11, according to a segment of a length corresponding to that of the strip-like element 13 to be obtained following subsequent operation of the cutting member 22. In the accompanying figures, a pair of guide rollers operating on the continuous strip element 21 at a region immediately upstream of the cutting member 22 is identified with 24.

Each of the laying units 18, 19 lends itself to sequentially engage each of the strip-like elements 13 prepared in the previously described manner, to determine application of same onto the radially external laying surface 14 exhibited by the forming drum 11.

In this regard, it should be pointed out that said radially external surface 14 can be either the radially external surface belonging to the forming drum 14 or, preferably, the radially external surface belonging to components of tyre 2 already laid on said forming drum 11, such as liner 4 for example.

Each of the laying units 18, 19 comprises at least one presser element 25 movable along the strip-like element 13, in a contrast relationship against the radially external surface 14 of the forming drum 11.

In more detail, in a preferred embodiment, use of at least two presser elements 25 is provided, each of them being carried by a support element 26 movable along a guide structure 27 upon the action of transverse-movement devices, of the worm screw type for example, not shown as they can be made in any manner convenient for a person skilled in the art.

Also preferably in engagement with each support element 26 is at least one auxiliary retaining element 28 adapted to co-operate with the respective presser element 25 to retain the strip-like element 13 at the instants elapsing between cutting of said strip-like element upon the action of the cutting unit 22 and application of same onto the forming drum 11.

In more detail, each auxiliary retaining element 28 can consist of a small plate (or other similar mechanical element) projecting from the respective support element 26 so as to offer a supporting seat for the continuous strip element 21 dragged along by the grip member 23 and for the cut strip-like element 13.

Associated with each of the laying units 18, 19 are radial-movement devices designed to move the presser elements 25 radially close to the radially external surface 14 of the forming drum 11. These radial-movement devices are not shown or described in detail as they can be made in any manner convenient for a person skilled in the art, and can operate on the guide structure 27 for example, and/or directly on the presser elements 25, in order to bring the strip-like element 13 in contact relationship on the radially external surface 14.

Also provided are transverse-movement devices, not shown too, as they can be made in any convenient manner, and operating between the guide structure 27 and the support elements 26 for example, to move the presser elements 25 between a first operating condition at which they are disposed mutually close and a second operating condition at which they are spaced apart relative to a transverse symmetry plane of the forming drum 11.

In the embodiment shown, the first and second laying units 18, 19 are installed on respective first and second frames 29, 30, mounted on the bearing structure 16. In more detail, the guide structure 27 of each of the laying units 18, 19 is connected to and supported by the respective frame 29, 30, which has a lattice structure surrounding the laying unit 18, 19 itself. When the bearing structure 16 is correctly installed with its base 31 resting on the ground, the first and second frames 29, 30 lie one upon the other substantially aligned along a vertical direction.

The seat in which the forming drum 11 is housed remains interposed between the first and second laying units 18, 19, and said two laying units 18, 19 face up towards the portions of the forming drum 11 lying on substantially opposite sides relative to the geometric axis "X-X".

According to a preferred embodiment, the first laying unit 18 is located over the forming drum 11 and the second laying unit 19 is located under the forming drum 11.

The bearing structure 16 therefore defines a sort of cage inside which the laying units 18, 19 and forming drum 11 are housed.

Apparatus 1 further comprises an adjustment device 32 entrusted with the task of shifting one of the laying units 18, 19 along an adjustment path "C-C" lying in a plane orthogonal to the geometric rotation axis "X-X" of the forming drum 11 and being substantially arced about the radially external laying surface 14 exhibited by the forming drum 11. Preferably, path "C-C" is an arc of a circumference coaxial with said geometric rotation axis "X-X" (FIGS. 4a and 4b).

In the non-limiting embodiment shown, the adjustment device 32 is mounted between the bearing structure 16 and the first frame 29 and therefore allows adjustment of the position of the first laying unit 18 along said path "C-C", so as to lay down the strip-like elements 13 in an even or odd number, as shown in the following.

In detail, the first frame 29 is installed on a supporting plate 33 which in turn is movable on the bearing structure 16 around an axis coincident with the geometric rotation axis "X-X" of the forming drum 11.

In the embodiment shown, the supporting plate 33 is hinged around said geometric rotation axis "X-X" and an actuator 34 spaced apart from this axis "X-X" causes rotational movement of same.

The supporting plate 33 further has an opening defining a housing region in which the forming drum 11 is accommodated, so that the first laying unit 18 can operate on the radially external surface 14 from the top.

Preferably, said housing region, as shown, is delimited by a C-shaped outline of the supporting plate 33 which is open towards a picking up' device 35 that, as illustrated in the following, enables the forming drum 11 to be easily put down into the seat or removed therefrom.

The second frame 30 is mounted on the base 31 of the bearing structure 16 and the second laying unit 19 operates on the radially external surface 14 of the forming drum 11 from below.

Apparatus 1 further comprises a first auxiliary adjustment device 36 and a second auxiliary adjustment device 37 capable of shifting each of said first and second laying units 18, 19 around respective correction axes "Y-Y", "Y'-Y'" that are substantially radial to the geometric rotation axis "X-X".

Figure 5:
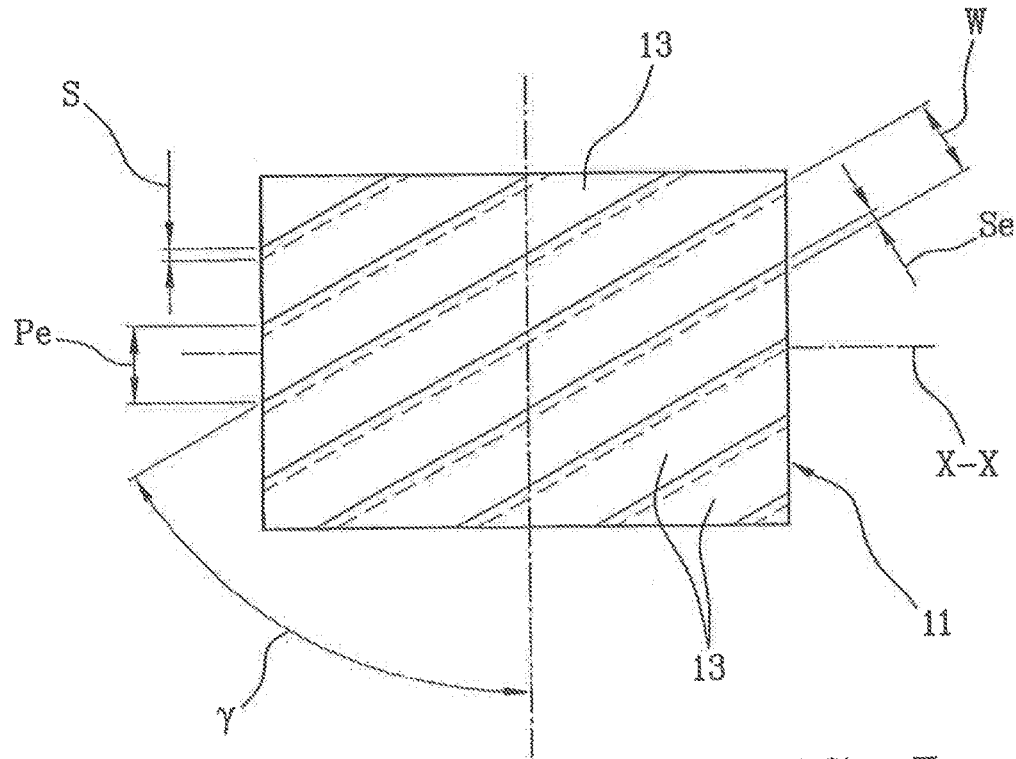
FIG. 5 is a diagrammatic front view of the forming drum seen in FIG. 3 provided with a carcass ply.

The auxiliary adjustment devices 36, 37 have the function of laying the strip-like elements 13 on the forming drum 11 with any angle relative to the circumferential extension of same, so as to make carcass plies in which the cords being part thereof have a ply angle γ different from 90° (FIG. 5) relative to a longitudinal extension direction of the ply, i.e. relative to a circumferential direction of the tyre to be made.

As illustrated, the first auxiliary adjustment device 36 comprises two arched guides 38 mounted on an upper face of the supporting plate 33 and coaxial with the respective correction axis "Y-Y". The first frame 29 is mounted by means of runners 39 on these arched guides 38 and an' actuator, not shown, enables said first frame 29 to be moved on said arched guides 38 around the respective correction axis "Y-Y". Likewise, the second auxiliary adjustment device 37 comprises two arched guides 40 mounted on the base 31 of the bearing structure 16 and coaxial with the respective correction axis "Y1-Y1". The second frame 30 is mounted by means of runners 41 on said arched guides 40 and an actuator, not shown, enables said second frame 30 to be moved on said arched guides 40 around the respective correction axis "Y'-Y'".

Each of the auxiliary adjustment devices 36, 37 allows a rotation of the laying units 18, 19 around the respective correction axes "Y-Y", "γ'-γ'" according to a rotation angle of about 60°, i.e. of about +/−30° relative to a direction parallel to the geometric rotation axis "X-X".

Preferably, apparatus 1 according to the invention comprises a plurality of work stations "WS" (diagrammatically shown in FIG. 1); among which the laying station 15, at each of which one or more of the above mentioned operations for manufacturing tyre 2 are carried out. For instance,—in a station placed before the laying station 15, liner 4 is applied onto the forming drum 11. In a station placed after the laying station 15, the annular anchoring structures 5 are associated with the carcass ply 3.

A transport line 42 extends between said work stations "WS" and is used to shift the forming drum 11 between one station "WS" and the subsequent one.

The above mentioned picking up device 35 is used to pick up the forming drum 11 from the transport line 42 and position it into the seat of the bearing structure 16 where it is engaged by the mandrel and, once the strip-like elements 13 have been applied, to bring the drum 11 back on the transport line 42. In the embodiment shown, the picking up device 35 comprises a lifter 43 moved by motors not shown along a vertical guide 44. Lifter 43 comprises a pair of arms 45 having grip ends 46 adapted to engage pins 47 of the forming drum 11 coaxial with the geometric rotation axis "X-X". Arms 45 are movable between a lower position and a raised position in which they substantially lie at the same height as the mandrel of the bearing structure 16.

The picking up device 35 further comprises a conveyor 48 moved by motors not shown along a horizontal guide 49. Conveyor 48 comprises a pair of arms 50 substantially placed at the same height as the mandrel of the bearing structure 16 and having catching clamps 51 adapted to engage the pins 47 of the forming drum 11. Arms 50 are movable between a first position at which they lie spaced apart from the bearing structure 16 and substantially over the transport line 42, and a second position at which they lie close to the mandrel in the bearing structure 16.

Lifter 43 carries drum 1 in the raised position where conveyor 48 picks it up and brings it as far as into the seat of the bearing structure 16. Once the forming drum 11 is positioned in the seat of the bearing structure 16 and associated with the mandrel, the position of the supporting plate 33 is adjusted in such a manner as to shift, if necessary, the first laying unit 18 along the arc of a circumference "C-C" and apply the strip-like elements 13 in the correct manner around drum 11.

In particular, shifting of the first laying unit 18 along the arc of a circumference "C-C" subtends a predetermined angle "α" measured relative to a diametrical vertical direction "d" passing through the second laying unit 19, the value of said predetermined angle "α" being calculated starting from the tyre fitting, the width 'W' of the strip-like elements 13, the ply angle "γ" and the possible width of the overlapped part "S" between adjacent strip-like elements 13.

The width "W" of the strip-like elements 13, measured transversely of the longitudinal extension of the strip-like element 13, is preferably included between about 20 mm and about 40 mm, more preferably between about 25 mm and about 35 mm.

In fact, according to an embodiment of the process, the strip-like elements 13 are mutually approached along the circumferential extension of drum 11.

According to a preferred variant of the process, the strip-like elements 13 on the contrary partly overlap each other. Under this situation, it is defined as the width of the overlapped part "S" the extension of the overlapped-part region between two adjacent strip-like elements 13 measured along the circumferential extension of the forming drum 11.

This width of the overlapped part "S" is preferably included between about 1 mm and 2.5 mm, more preferably included between about 1.5 mm and 2 mm.

In more detail, the circumferential extension of drum 11 and the circumferential 'extension of the radially external surface 14 corresponding to the extension of the carcass ply 3 are calculated from the fitting diameter and from the thickness of liner 4, if any, or of possible other components to be previously laid on the forming drum 11.

The width "W" of the strip-like elements 13 and the ply angle "γ" being known, and given the width of the overlapped part "S", a theoretical pitch of the strip-like elements 13 is calculated along the extension of drum 11. The theoretical pitch is equal to the difference between the width "W" of the strip-like elements 13 and the width of the overlapped part "S" divided by the sine of the ply angle "γ".

Calculated from the theoretical pitch is the number of strip-like elements 13 necessary to have that theoretical pitch, as the ratio of the circumferential extension of ply 3, liner 4 being taken into account, to the theoretical pitch, and this number is approximated to the closest integer or whole number In particular, if the difference between the calculated number and its whole part is smaller than or equal to 0.5, approximation to the lower integer "n" is done. If the difference between the calculated number and its whole part is greater than or equal to 0.51 approximation to the higher integer "n" is done.

The whole number of strip-like elements 13 being known, the true pitch "$P_e$" of the strip-like elements 13 is calculated and, since the width "W" of the strip-like elements 13 is fixed, the true width of the overlapped part "$S_e$". The true pitch "$P_e$" is equal to the ratio between the circumferential extension of the ply and the whole number "n". The true width of the overlapped part "$S_e$" is equal to the difference between the width "W" of the strip-like elements 13 and the true pitch "$P_e$" multiplied by the sine of the ply angle "γ".

Being the number of the strip-like elements 13 known, it is further calculated the advancing angle "β" that the forming drum 11 must cover at each rotation step, as the ratio between the round angle and the whole number "n".

If the whole number "n" of strip-like elements 13 to be laid down is an even number, the first laying unit 18 is positioned exactly on the vertical diametrical direction "d" passing through the second laying unit 19, i.e. exactly facing the second laying unit 19. Under this situation the predetermined angle "α" as above defined is equal to zero.

The first laying unit 18 being thus positioned, the forming drum 11 is moved forward by steps and at each step the two laying units 18, 19 apply two strip-like elements 13.

The two units 18, 19 apply the same number of strip-like elements 13 corresponding to half the whole number "n" and each unit 18, 19 applies the strip-like elements on an arc of 180°.

In addition, during laying of the strip-like elements 13 a relative angular rotation is carried out between the strip-like elements 13 and the forming drum 11 by rotation of the first and second frames 29, 30 around the respective correction axes "Y-Y", "Y'-Y'", preferably in a progressive manner during laying of the strip-like elements 13 themselves, so as to obtain the ply angle "γ".

If the whole number "n" of strip-like elements 13 to be laid down is an odd number, the first laying unit 18 is positioned in such a manner that the predetermined angle "α" is equal to about half the advancing angle "β" (FIGS. 4a and 4b).

This predetermined angle "α" is preferably included between about 2° and about 10° and more preferably between about 4° and about 8°.

The first laying unit 18 being thus positioned, the forming drum 11 is moved forward by steps and at each of the first rotation steps the two laying units 18, 19 apply a pair of strip-like elements 13 each time.

Due to the mutual position of the two laying units 18, 19, the two strip-like elements—13 of the pair are mutually offset relative to a diametrical direction passing through the geometric rotation axis.

Therefore an empty portion remains where a single strip-like element 13 is to be ˆ applied in register with a last rotation step, which strip-like element is applied by one alone of the laying units 18, 19 while the other is idle (FIG. 4b).

In accordance with an embodiment of the process shown in FIGS. 4a and 4b, the first laying unit 18 is shifted along the path "C-C" in a direction consistent with a rotation direction "V" of the forming drum 11.

Under this situation, the single strip-like element 13 is laid last by the first laying unit 18.

In accordance with an alternative embodiment of the process, the first laying unit 18 is shifted along the path "C-C" in an opposite direction relative to the rotation direction "V" of the forming drum 11.

Under this situation, the single strip-like element 13 is laid last by the second laying unit 19.

Preferably, apparatus 1 further comprises a control unit, not shown, which is interfaced with a calculation unit capable of carrying out the above mentioned calculations based on the input data (fitting diameter of drum 11, radial thickness of the components laid on the drum prior to the carcass ply/plies 3, width "W" of the strip-like elements 13, ply angle "γ" and width of the overlapped part "S") entered by an operator, and by means of devices capable of automatically operating at least the adjustment device 32 to shift the first laying unit 18 based on the calculated data.

The invention claimed is:

1. An apparatus for manufacturing tyres for vehicle wheels, each tyre comprising a carcass structure including at least one carcass ply, a tread band at a radially external position to said carcass structure and a belt structure interposed between said carcass structure and tread band, the tyres being manufactured including tyres comprising carcass plies made by laying down an even whole number of strip-like elements and tyres comprising carcass plies made by laying down an odd whole number of strip-like elements, comprising:
   a forming drum having at least one radially external laying surface;
   devices for building at least one carcass ply around said radially external surface, said at least one carcass ply having axially opposite end flaps;
   wherein the devices for building at least one carcass ply around said radially external surface comprise:
      devices for setting the forming drum in rotation around a geometric rotation axis thereof;
      a first laying unit and a second laying unit mounted at mutually opposite portions of the forming drum and adapted to apply a plurality of strip-like elements along the circumferential extension of the forming drum;
      an adjustment device for shifting the first laying unit along an arced adjustment path which lies in a plane orthogonal to the geometric rotation axis, the arced adjustment path being an arc of a circumference coaxial with the geometric rotation axis for applying a single strip-like element;
   a bearing structure adapted to carry the forming drum;
   a first frame installed on the bearing structure above the forming drum and carrying the first laying unit; and
   a second frame installed on the bearing structure under the forming drum and carrying the second laying unit, wherein the adjustment device is mounted between the bearing structure and the first frame to shift the first laying unit along said adjustment path and wherein the adjustment device comprises a supporting plate hinged on the bearing structure around a hinge axis coincident with the geometric rotation axis and at least one actuator disposed between the supporting plate and the bearing structure, the first frame being installed on said supporting plate.

2. The apparatus as claimed in claim 1, wherein said first laying unit and second laying unit are adapted to apply pairs of strip-like elements.

3. The apparatus as claimed in claim 1, comprising a first auxiliary adjustment device and a second auxiliary adjustment device to shift each of said first and second laying units around respective correction axes that are substantially radial to the geometric rotation axis.

4. The apparatus as claimed in claim 1, wherein the supporting plate has a C-shaped conformation delimiting a housing region adapted to receive the forming drum.

5. The apparatus as claimed in claim 1, comprising a first auxiliary adjustment device and a second auxiliary adjustment device to shift each of said first and second laying units around respective correction axes that are substantially radial to the geometric rotation axis, wherein the second auxiliary adjustment device comprises:
- arched guides mounted on the bearing structure and coaxial with a correction axis that is substantially radial to the geometric rotation axis, the second frame being mounted on said arched guides; and
- at least one actuator to move the second frame on said arched guides.

6. The apparatus as claimed in claim 1, comprising a first auxiliary adjustment device and a second auxiliary adjustment device to shift each of said first and second laying units around respective correction axes that are substantially radial to the geometric rotation axis, wherein the first auxiliary adjustment device comprises:
- arched guides mounted on the supporting plate and coaxial with a correction axis that is substantially radial to the geometric rotation axis, the first frame being mounted on said arched guides; and
- at least one actuator to move the first frame on said arched guides.

7. The apparatus as claimed in claim 1, comprising successive work stations; a transport line extending between said successive work stations; a picking-up device to shift the forming drum between the transport line and a work region of the bearing structure positioned between the first and second laying units.

8. The apparatus as claimed in claim 7, wherein the picking-up device comprises a vertically movable lifter and a horizontally movable conveyor.

9. The apparatus as claimed in claim 1, wherein the forming drum has a substantially cylindrical side surface.

10. The apparatus as claimed in claim 1, comprising at least one calculation unit to calculate a whole number of strip-like elements to be laid down.

11. The apparatus as claimed in claim 10, wherein said calculation unit is interfaced with a control unit for command of said adjustment device when an odd number of strip-like elements is to be laid down.

* * * * *